United States Patent [19]

Higashiyama

[11] Patent Number: 4,679,225
[45] Date of Patent: Jul. 7, 1987

[54] SIGNAL TRANSMISSION APPARATUS FOR A MULTIPLE CHANNEL SYSTEM AND METHOD FOR USING THE SAME

[75] Inventor: Mitsuo Higashiyama, Kanagawa, Japan

[73] Assignee: Sony Corporation, Tokyo, Japan

[21] Appl. No.: 745,943

[22] Filed: Jun. 18, 1985

[30] Foreign Application Priority Data

Jun. 25, 1984 [JP] Japan ............................... 59-129388

[51] Int. Cl.$^4$ .................. H04M 11/00; H04M 11/06; H04Q 7/04
[52] U.S. Cl. ...................................... 379/62; 379/58; 379/61; 455/32
[58] Field of Search ............... 179/2 EA; 340/825.03, 340/825.04, 825.3, 825.31, 825.34, 825.5; 455/32, 34, 54, 62, 70; 379/56, 61, 62, 63

[56] References Cited

U.S. PATENT DOCUMENTS

| | | | |
|---|---|---|---|
| 3,845,391 | 10/1974 | Crosby | 455/70 X |
| 4,332,981 | 6/1982 | Palombi et al. | 179/2 EA |
| 4,467,141 | 8/1984 | Resch et al. | 179/2 EA |
| 4,541,118 | 9/1985 | Eastmond et al. | 455/70 X |

Primary Examiner—Gene Z. Rubinson
Assistant Examiner—Mark E. Ham
Attorney, Agent, or Firm—Lewis H. Eslinger; Alvin Sinderbrand

[57] ABSTRACT

Signal transmission apparatus is provided for a communications system having a plurality of transmitters for transmitting information signals over any one of several transmission channels, and further having a plurality of receivers for receiving the information signals over any one of the transmission channels. In order to establish a selected transmission channel between a particular transmitter and a particular receiver, the transmitter selects an unoccupied transmission channel and transmits thereon a code identifying the receiver using a wide band signal for high speed bit transmission. When the receiver detects the presence of the identifying code over a particular channel, it first determines that the transmitter is the particular transmitter and, if so, establishes the transmission channel therebetween. The transmitter confirms that the transmission channel has been established, and then continues to transmit the identifying code repeatedly over the transmission channel using a narrow band signal with a low bit transmission rate. Both the wide band and narrow band signals containing the identifying code are included within the audio signal transmission band, so that no extra bandwidth is required for transmission of the identifying code.

16 Claims, 7 Drawing Figures

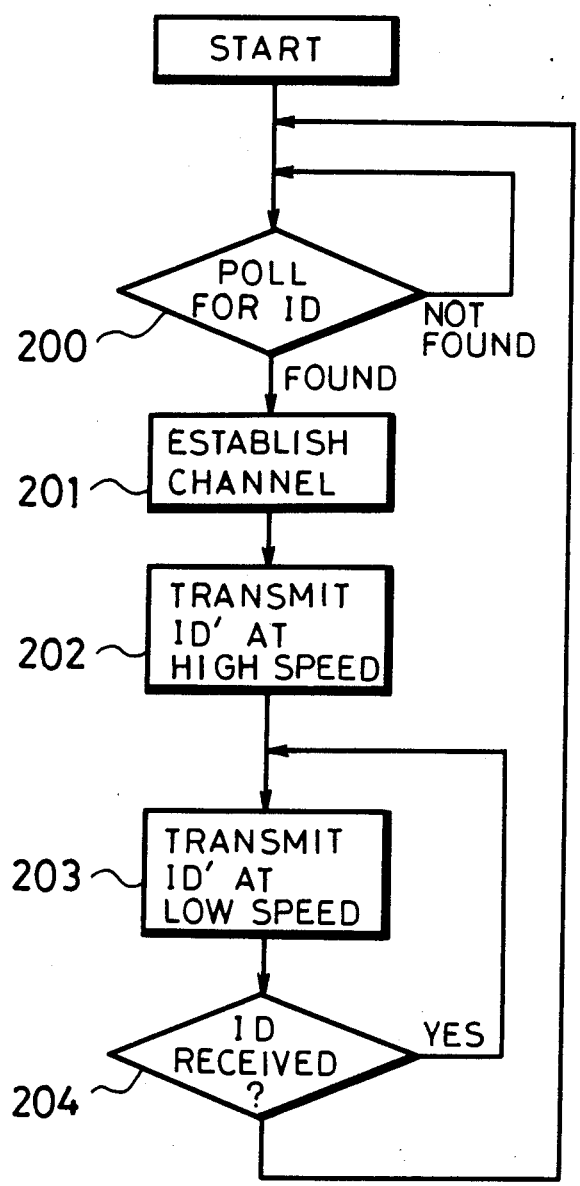

SIGNAL TRANSMISSION APPARATUS FOR A MULTIPLE CHANNEL SYSTEM AND METHOD FOR USING THE SAME

FIELD OF THE INVENTION

This invention relates generally to signal transmission apparatus, and more particularly is directed to signal transmission apparatus for establishing a selected transmission channel within a multiple channel system for use in, for example, a cordless telephone.

BACKGROUND OF THE INVENTION

The radio frequency range of the electromagnetic spectrum is used for transmitting information signals between transmitters and receivers in many different types of communication systems, and is divided into standard frequency ranges which are assigned to the different types of systems to prevent interference between transmissions. Ideally, each transmitter should have its own assigned frequency range, but while the total available radio frequency range is intrinsically limited, the number of systems is not. Instead, the assigned frequency range must somehow be shared by all the transmitters of the system. Frequently the assigned frequency range is itself divided up into a number of transmission channels, but even so there are usually more transmitters than transmission channels, so that the transmission channels themselves must be shared.

A variety of communications systems are presently available which include a number of transmitters and a number of receivers, each transmitter able to transmit information signals over any one of several transmission channels, and each receiver able to receive such information signals transmitted over any of these transmission channels. It is usually intended that each transmitter will establish a transmission channel only with one respective receiver. An example of such a communications system is a cordless telephone system, where a particular frequency range has been assigned by the Federal Communications Commission to all cordless telephones within the system. Needless to say, the number of cordless telephones already greatly exceeds the number of available transmission channels.

Therefore, methods have been developed for sharing the available frequency range among the cordless telephones within the system so as to minimize interference. This interference could be in the form of noise from other transmissions or from actual conversations picked up from nearby cordless telephones, each operating over the same transmission channel. Each transmission channel generally includes an audio signal transmission band over which the audio signals will be transmitted once the transmission channel has been established between a particular transmitter and a particular receiver. When no transmitter is transmitting over a particular transmission channel, it is known that the electric field intensity within the corresponding frequency range will be less than a predetermined level. According to one method, then, each transmitter sequentially scans the transmission channels and detects the received electric field intensity at the corresponding frequency ranges to determine whether any of the transmission channels are unoccupied, and selects an unoccupied one for transmission. Once a particular transmission channel has been selected, the audio signal transmission band thereof is used for transmitting an identifying code, uniquely identifying the transmitter to its respective receiver. This identifying code is used by the receiver to establish the transmission channel between itself and the transmitter. Each transmitter/receiver pair has identifying codes uniquely assigned to it by which each component may identify signals transmitted by the other.

Meanwhile, the receiver carries out a conventional polling operation whereby it checks each of the transmission channels to see if the correct identifying code is present. When this is detected, the receiver stops the polling operation and establishes the transmission channel over which it received the correct identifying code between itself and the transmitter. Thereafter, the receiver is adapted to receive the audio signals from the transmitter over this particular transmission channel.

However, while the audio signal transmission band of the particular transmission channel may be used to transmit the identifying code before the transmission channel is established between the transmitter and receiver, it can no longer be so used once the transmission channel is established and an actual audio signal is being transmitted. In such case, there would be interference between the identifying code and the actual audio signal. On the other hand, if the identifying code is no longer transmitted, there is no way to continue to check that the signal is still being received from the correct transmitter. It would be highly advantageous to continue to transmit the identifying code after the transmission channel is established.

To remove this defect, it has been proposed to mix the identifying code with the actual audio signal by time division multiplexing, so that the identifying code may be repetitively transmitted to the receiver. The receiver discriminates between the actual audio signal and the identifying code on a time basis. However, this requires that the actual audio signal be periodically interrupted to allow the transmission of the identifying code, which can lead to objectionable results when the audio signal is transformed into sound.

Another proposal is to transmit the identifying code over a separate frequency band, i.e. frequency division multiplexing. However, if this separate frequency band has a bandwidth equivalent to the standard audio signal transmission band, this will rapidly use up the available bandwidth, reducing the number of available transmission channels. If, on the other hand, only a narrow bandwidth is used for the transmission of the identifying code, then the bit transmission rate for the identifying code is reduced, so that it takes a relatively long time to transmit the identifying signal and thereby to establish the transmission channel between the transmitter and the receiver.

OBJECTS AND SUMMARY OF THE INVENTION

Accordingly, it is an object of the present invention to provide a signal transmission apparatus which removes the above-described difficulties of the prior art.

It is another object of the present invention to provide a signal transmission apparatus wherein an identifying code may be transmitted by using an audio signal transmission band of a particular transmission channel both before and after establishing the transmission channel without causing interference with an actual audio signal also transmitted over the audio signal transmission band.

It is a further object of the present invention to provide a signal transmission apparatus wherein an identifying code is initially transmitted at high speed so that the transmission channel may be established quickly between the receiver and the transmitter, and in which the identifying code is transmitted at a low speed after the establishment of the transmission channel.

In accordance with an aspect of the present invention, there is provided signal transmission apparatus for use in a communications system having a plurality of transmitters for transmitting information signals including audio signals over any one of a plurality of transmission channels, and further having a plurality of receivers for receiving the information signals transmitted over any of the transmission channels, each of the transmission channels having a respective total frequency range including an allocated range for transmitting said audio signals. The signal transmission apparatus for establishing a selected transmission channel between a predetermined one of the transmitters and a predetermined one of the receivers comprises means at the predetermined transmitter for selecting one of the transmission channels, and means for transmitting at least a control signal indicative of the identity of the predetermined transmitter over the selected transmission channel, the means for transmitting initially the control signal by using substantially all of the allocated range of the selected transmission channel. The predetermined receiver includes means for establishing the selected transmission channel between it and the predetermined transmitter only in response to the receipt of the control signal identifying the predetermined transmitter, and there are provided means at the predetermined transmitter for confirming that the selected transmission channel has been established with the predetermined receiver and for generating a confirmation output thereon, the predetermined transmitter being responsive to the confirmation output for transmitting the audio signals by using a first portion of said allocated range, and the means for transmitting being responsive to the confirmation output for transmitting the control signal by using a second portion of said allocated range separate from said first portion.

These, and other, features and advantages of the present invention will become apparent from the following detailed description of a preferred embodiment of the signal transmission apparatus according to the present invention taken in conjunction with the accompanying drawings.

BRIEF DESCRIPTION OF THE DRAWINGS

FIG. 6 is a flowchart of the operation of the handset unit of FIG. 4.

DESCRIPTION OF THE PREFERRED EMBODIMENT

Figure 1:
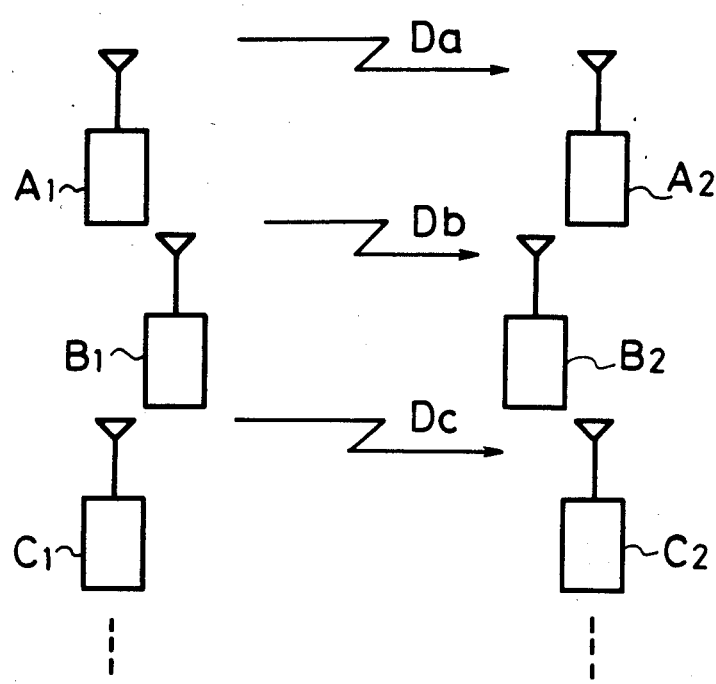
FIG. 1 is a schematic diagram illustrating receivers and transmitters of a communications system wherein the signal transmission apparatus according to the present invention may be advantageously utilized.

Referring now to the drawings, and initially to FIG. 1 thereof, a communications system of the type advantageously utilizing signal transmission apparatus according to the present invention has a plurality of transmitters $A_1, B_1, C_1$ and a plurality of receivers $A_2, B_2, C_2$. Transmitter $A_1$ is intended to communicate only with receiver $A_2$, transmitter $B_1$ with receiver $B_2$ and transmitter $C_1$ with receiver $C_2$, respectively. However, all the transmitter/receiver pairs share a single frequency range over which signals may be transmitted, and this frequency range is divided into a plurality of transmission channels, $f_1, f_2, \ldots f_n$. It is contemplated that the total number of transmitter/receiver pairs exceeds the number of available transmission channels, so that they must share the transmission channels. Only one transmitter/receiver pair is to use any particular transmission channel at a time.

Each transmitter/receiver pair has associated therewith a unique identifying code, provided as a string of binary digits. Thus, transmitter/receiver pair $A_1, A_2$ has identifying code $D_a$, transmitter/receiver pair $B_1, B_2$, has identifying code $D_b$, and transmitter/receiver pair $C_1, C_2$ has identifying code $D_c$. The identifying codes $D_a, D_b, D_c$ are used by the respective transmitter/receiver pairs to ensure that, for example, receiver $A_2$ will receive signals only from transmitter $A_1$, as will be described below.

The manner in which the transmitter/receiver pairs share the transmission channels is as follows. It should be understood in the discussion below that each of the transmitters $A_1, B_1, C_1$, is capable of transmitting signals over any one of the transmission channels at a time. Suppose now that transmitter $A_1$ is to transmit signals which receiver $A_2$ alone is to receive. Transmitter $A_1$ begins this process by sequentially scanning the available transmission channels beginning from a predetermined transmission channel to determine whether any is unoccupied, i.e. not being used by any of the remaining transmitters in the communications system. This is done by detecting the intensity of the electrical field in the frequency range corresponding to each transmission channel. If the transmission channel is not being used, the electric field intensity will be less than a predetermined level. The electric field intensity could be high due to the fact that one of the other transmitters, for example, the transmitter $B_1$, is transmitting over this transmission channel, or due to some external signal totally unrelated to the particular communication system. In any event, if the electric field intensity is above the predetermined level, this in and of itself would create significant interference with any signals broadcast over the transmission channel at these frequencies, and so the transmission channel is not selected.

Figure 2A:
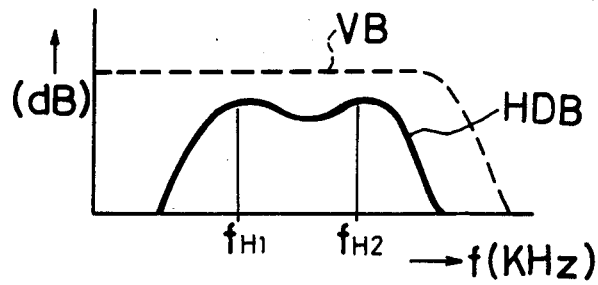
FIG. 2A is a frequency spectrum plot illustrating the frequencies used for transmitting an identifying code prior to the establishment of a transmission channel with a receiver in accordance with the present invention.

Once a transmission channel has been located where the electric field intensity is less than the predetermined level, this transmission channel, for example, $f_1$, is selected. Then transmitter $A_1$ uses the audio signal transmission band VB (FIG. 2A), allocated for the transmission of the audio signals and ranging from 0 to 4 KHz, to transmit identifying code $D_a$ as a control signal. This control signal may advantageously be generated by minimum shift key (MSK) modulation of the binary identifying code, as illustrated in FIG. 2A. When the frequencies $f_{H1}$ and $f_{H2}$ for the MSK modulation are chosen to be 1200 Hz and 1800 Hz, respectively, as illustrated, the resultant wideband MSK signal HDB occupies frequencies from 600 to 2400 Hz, that is, substantially the entire audio signal transmission band VB. Accordingly, since the bit transmission rate is proportional to bandwidth, identifying code $D_a$ can be transmitted at a fast bit transmission rate of up to 1200 bps (bits per second). Thus, the entire identifying code $D_a$ can be transmitted over transmission channel $f_1$ in a very short time.

Meanwhile, receiver $A_2$ is sequentially searching the available transmission channels in the conventional polling operation, looking for a transmission channel in which the proper identifying code is present. If transmitter $A_1$ were not transmitting at all, identifying code $D_a$ would not be found in any of the transmission channels, and so no transmission channel would be established. In the present case, it is assumed that transmitter $A_1$ has selected transmission channel $f_1$ and identifying code $D_a$ appears therein. Receiver $A_2$ is responsive to the receipt of this correct identifying code $D_a$ to stop its searching operation and to establish transmission channel $f_1$, using the frequencies thereof as its operating frequencies.

Figure 2B:
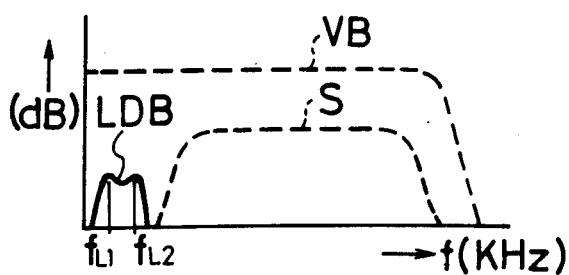
FIG. 2B is a frequency spectrum plot illustrating the frequencies used for transmitting the identifying code and an actual audio signal after the transmission channel has been established.

During this time, identifying code $D_a$ is repeatedly transmitted by transmitter $A_1$. After sufficient time has elapsed for receiver $A_2$ to scan through all the transmission channels, to identify the received identifying code as the correct identifying code $D_a$, and to establish transmission channel $f_1$, transmitter $A_1$ stops transmitting identifying code $D_a$ over the wide band signal HDB. The elapsed time may simply be measured, or, as in the preferred embodiment described below, receiver $A_2$ may retransmit a second control signal to indicate that transmission channel $f_1$ has been established. In either case, transmitter $A_1$ then transmits identifying code $D_a$ by using only a narrow band signal LDB, as illustrated in FIG. 2B. Narrow band signal LDB extends from 60 to 240 Hz within audio signal transmission band VB, but is separate from a transmission band S used by transmitter $A_1$ for transmitting the actual audio signal once transmission channel $f_1$ has been established. In the illustrated embodiment, when the narrow band signal LDB is generated by MSK modulation of identifying code $D_a$ using $f_{L1}$ at 120 Hz and $f_{L2}$ at 180 Hz, the bit transmission rate is 120 bits per second. The audio signal, however, lies in transmission band S from approximately 300 to 3400 Hz.

In this manner, once transmission channel $f_1$ has been established between transmitter $A_1$ and receiver $A_2$, both the actual audio signal and identifying code $D_a$ are transmitted. Thus, it is possible to continue to confirm that the received signal was in fact transmitted from transmitter $A_1$, and not from another transmitter.

Furthermore, while the bit transmission rate for identifying code $D_a$ is initially high so that transmission channel $f_1$ can be quickly established, the bit transmission rate is relatively low after transmission channel $f_1$ has been established. Since identifying code $D_a$ is now used only to confirm that transmitter $A_1$ is transmitting the audio signal received at receiver $A_2$, the low bit transmission rate is sufficient.

In accordance with the present invention, then, a signal transmission apparatus is provided which eliminates the above-described difficulties of the prior art. The transmission channel is established quickly by the rapid transmission of the identifying code by using substantially the entire audio signal transmission band. Furthermore, once the transmission channel has been established, the identifying code continues to be transmitted, but by using only a relatively narrow band of the audio signal transmission band, while the greater part of this band is now utilized for the transmission of the actual audio signal. The frequency range for transmitting the identifying code lies outside of and is separate from the frequency range used to transmit the actual audio signal, so that there is no interference between the two. However, both HDB and LDB lie within the audio signal transmission band, so that extra bandwidth to transmit control signals is not required. Furthermore, there is no need to time multiplex the two signals, so that the actual audio signal need not be interrupted.

So far the theoretical function and operation of the signal transmission apparatus according to the present invention have been described in detail, but without application to a particular communications system. However, there are a variety of communications systems in which such signal transmission apparatus may advantageously be employed. One example of such a communications system is a cordless telephone system, illustrated in FIGS. 3 and 4. Of course, it will be understood that the signal transmission apparatus according to the present invention could advantageously be used in a variety of different communications systems.

Heretofore each transmission channel has been described as having one particular range of frequencies. However, in cordless telephones such as the one described in connection with FIGS. 3 and 4, each transmission channel is in fact a duplex transmission channel, having upper and lower subchannels. Conventionally, the base unit of the cordless telephone will transmit over a first subchannel and receive over the second subchannel, while the handset unit will transmit over the second subchannel and receive over the first subchannel.

Figure 3:
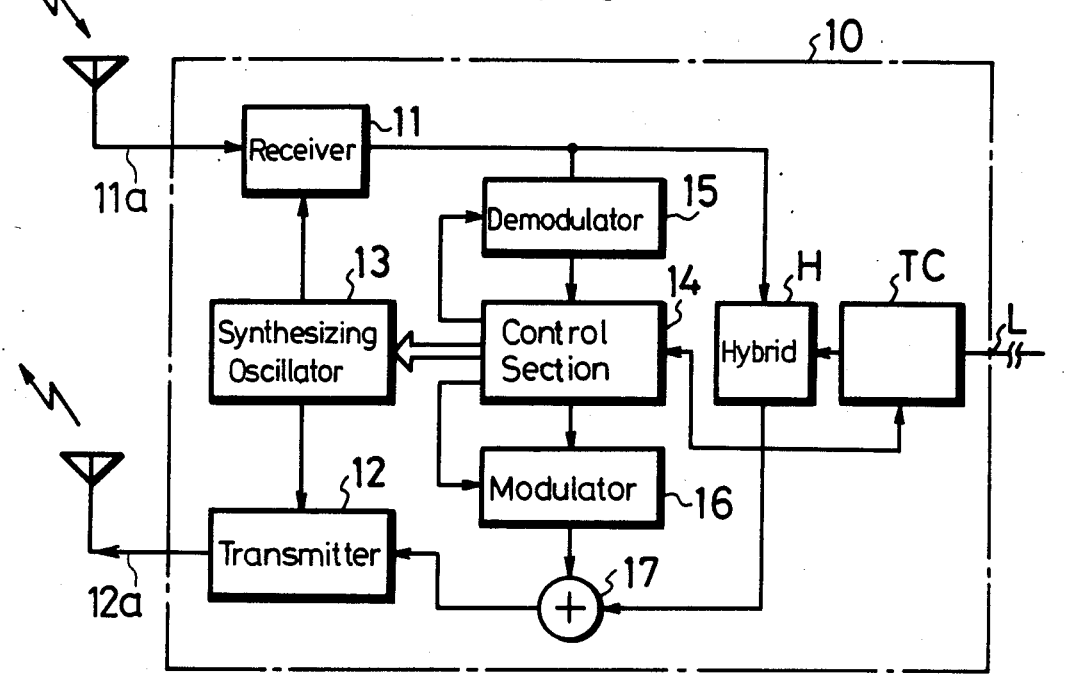
FIG. 3 is a block diagram of a base unit of a cordless telephone incorporating signal transmission apparatus according to the present invention.

Referring now to FIG. 3, a base unit 10 of one cordless telephone in the system includes a receiver 11 connected to an antenna 11a for receiving signals transmitted over the transmission channels. A transmitter 12 is connected to an antenna 12a. Base unit 10 also includes a synthesizing oscillator 13, which operates as a local oscillator supplying local oscillation signals to receiver 11 and transmitter 12 for determining the receiving frequency and the transmitting frequency thereof, respectively. Base unit 10 includes a control section 14, which may advantageously be embodied in a suitably programmed microcomputer or microprocessor. One advantageous example of a suitable microprocessor is the MSM6404, supplied by Oki Electric Industry Company, Ltd., of Japan. Base unit 10 further includes a demodulator 15, a modulator 16, an adding circuit 17, and other known elements forming a conventional base unit 10 for a cordless telephone. A telephone terminal section TC is connected to a telephone network line L for receiving and transmitting telephone message signals therethrough and is also connected to a hybrid circuit H. Hybrid circuit H conventionally contains both solid state elements and moving relays for connecting the internal elements of base unit 10 with the external telephone network line L. As necessary, hybrid circuit H interchanges the transmission and reception of signals between two and four lines.

Figure 4:
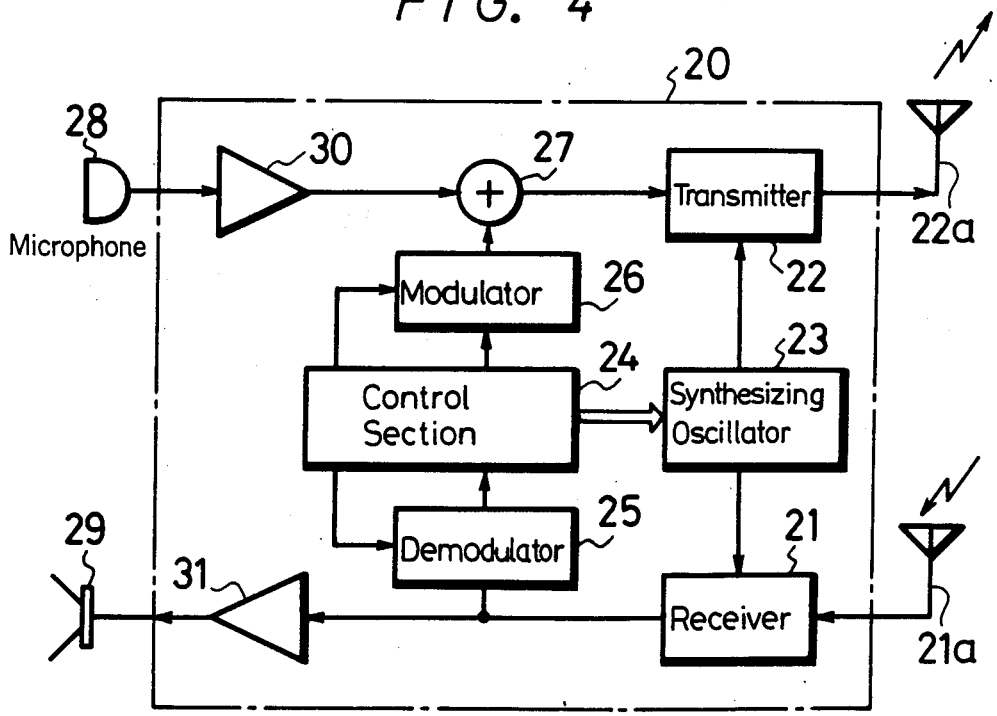
FIG. 4 is a block diagram of a handset unit of the cordless telephone of FIG. 3.

The other unit of the cordless telephone is handset unit 20, illustrated in FIG. 4. Handset unit 20 contains many elements corresponding in function to those of base unit 10, in particular receiver 21, antenna 21a, transmitter 22, antenna 22a, synthesizing oscillator 23, control section 24, demodulator 25, modulator 26, and adding circuit 27. Since handset unit 20 is used as the telephone receiver for conversation, it further includes a microphone 28 connected to an amplifier 30, to convert the operator's voice into electric signals, and a loudspeaker 29 fed by an amplifier 31, to reproduce the caller's voice.

The operation of base unit 10 and handset unit 20 when an incoming call is received will now be described. When an incoming call appears on telephone network line L, a call signal is supplied from telephone terminal section TC to control section 14. Control section 14 thereupon supplies a control signal to synthesizing oscillator 13 to cause it to vary the operating frequency of receiver 11 so that it will carry out the conventional search operation beginning from an arbitrarily predetermined transmission channel, as described above, to detect and identify an unoccupied transmission channel of the several transmission channels available to base unit 10. If an unoccupied transmission channel $f_1$ is detected, synthesizing oscillator 13 is controlled by control section 14 so as to set the frequency of the first subchannel of transmission channel $f_1$ as the transmission frequency for transmitter 12 and the frequency of the second subchannel as the receiving frequency for receiver 12. The transmission channel $f_1$ is also set for modulator 16 and demodulator 15. An identifying code ID uniquely assigned to base unit 10 is stored in control section 14. Advantageously, this may be the telephone number of the cordless telephone itself. Identifying code ID is read from control section 14 and supplied to modulator 16, wherein it is MSK modulated to become wideband signal HDB occupying substantially the entire audio signal transmission band VB, as shown in FIG. 2A, and is supplied through adder 17 to transmitter 12. Because identifying code ID has been modulated to occupy the relatively large bandwidth of the entire audio signal transmission band VB, it may be transmitted at a high bit transmission rate to handset unit 20.

Referring now to FIG. 4, handset unit 20 conventionally includes an ON/OFF control (not illustrated) for enabling and disabling it, respectively, to receive transmitted signals. When handset unit 20 is enabled, it repeatedly performs the polling operation, described above, to determine whether the appropriate identifying code ID is being transmitted over any of the transmission channels. In the present circumstance, base unit 10 is in fact transmitting the appropriate identifying code ID, which is received by receiver 21, and supplied through demodulator 25 to control section 24. In control section 24, the received identifying code is checked for identity with a stored identifying code ID'. If they are identical, control section 24 provides a control signal to synthesizing oscillator 23 to set the receiving frequency of receiver 21 at the frequency of the first subchannel of transmission channel $f_1$ over which identifying code ID was received, i.e. the transmission channel selected by base unit 10. Synthesizing oscillator 23 similarly provides a control signal to transmitter 22 to set its transmission frequency as that of the second subchannel of selected transmission channel $f_1$. Further, control section 24 also supplies control signals to set modulator 26 and demodulator 25. This process is referred to herein as establishing the selected transmission channel.

At this time, identifying code ID' stored in control section 24 is supplied to modulator 26, wherein it is MSK modulated using substantially the entire audio signal transmission band VB, in the same way as identifying code ID in base unit 10, and then is supplied through adder 27 to transmitter 22, by which it is transmitted for a predetermined interval at a high bit transmission rate to base unit 10. The retransmission of identifying code ID' stored in handset unit 20 provides an additional check to ascertain that the proper base unit 10 will be communicating with its respective handset unit 20.

The retransmitted identifying code ID' is received by base unit 10 at receiver 11, demodulated by demodulator 15, and supplied to control section 14. The predetermined interval during which identifying code ID' is transmitted is made long enough to allow receiver 11 to receive it with certainty. If in fact the received identifying code ID' is the same as stored identifying code ID, control section 14 supplies a control signal to telephone terminal section TC to cause a connection with telephone network line L whereby the telephone message signals may now be supplied through telephone terminal section TC to hybrid circuit H. Hybrid circuit H then supplies the telephone message signals to adder 17. Control section 14 also supplies a control signal to modulator 16 to change the modulating frequencies creating the MSK modulated signal from $f_{H1}$, $f_{H2}$ to $f_{L1}$, $f_{L2}$, so that the MSK modulated signal no longer occupies substantially the entire audio signal transmission band VB, as illustrated in FIG. 2A, but rather occupies the significantly narrower transmission band of signal LDB, illustrated in FIG. 2B. The actual audio signal, i.e. the telephone message signal, on the other hand, occupies the wide band transmission band S of FIG. 2B. The MSK modulated signal LDB from modulator 16 and the telephone message signal from hybrid circuit H are combined in adder 17 and then supplied to transmitter 12 for transmission to handset unit 20.

When base unit 10 receives identifying code ID' over the second subchannel of transmission channel $f_1$ selected by control section 14 for transmission, and when control section 14 has determined that received identifying code ID' is the same as stored identifying code ID, this confirms that transmission channel $f_1$ has been established between base unit 10 and its paired handset unit 20. The control signal supplied by control section 14 to modulator 16 and telephone terminal section TC as a consequence of this confirmation may be regarded as a confirmation output. Modulator 16 is responsive to this confirmation output to change the modulating frequencies to produce narrow band signal LDB. Telephone terminal section TC is responsive to the confirmation output to connect the telephone network line L to hybrid circuit H to enable the transmission therethrough of the telephone message signals.

Handset unit 20 receives the combined signal at receiver 21 and supplies the same through amplifier 31 to loudspeaker 29. Loudspeaker 29 is adapted to reproduce the actual audio signal so as to simulate the caller's voice. Meanwhile, the combined signal from receiver 21 is also supplied to demodulator 25, which demodulates signal LDB containing identifying code ID and supplies the same to control section 24. Thus, a continuing check of identifying code ID may be performed. Similarly, electric signals corresponding to the operator's voice are produced by microphone 28 and supplied through amplifier 30 to adder 27. Identifying code ID' is supplied to modulator 26, which also produces the narrow band MSK signal LDB at a low bit transmission rate. The two signals are combined in adder 27 and supplied to transmitter 22 for transmission to base unit 10. In base unit 10, the combined signals are received at receiver 11 and processed in a similar manner.

Figure 5:
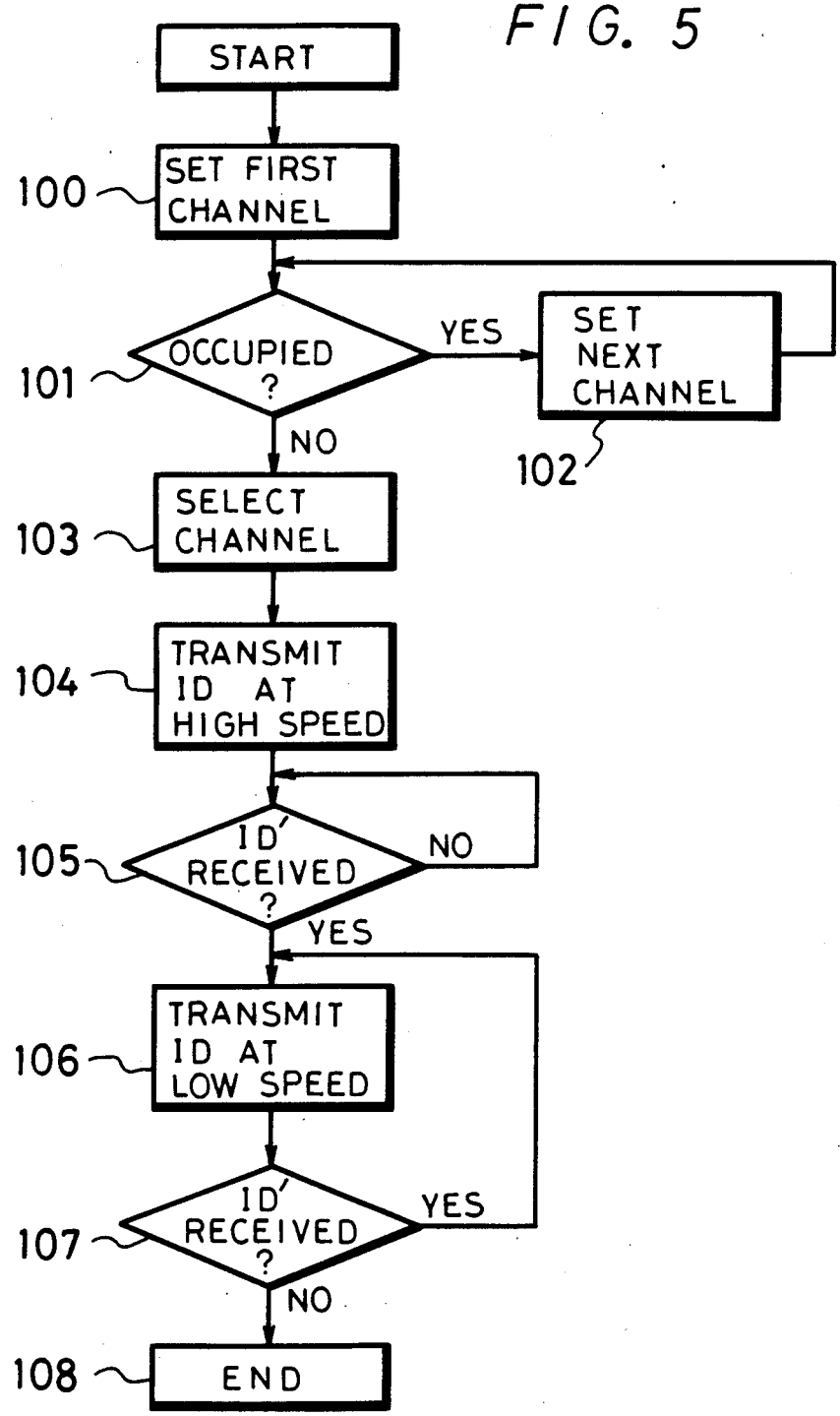
FIG. 5 is a flowchart of the operation of the base unit of FIG. 3.

The operations of base unit 10 and handset unit, under the control of control sections 14 and 24, respectively, are illustrated in FIGS. 5 and 6. Referring first to FIG. 5, which is a flowchart of the operation of base unit 10, when an incoming telephone call appears on telephone network line L and the call signal is transmitted, control section 14 loads a routine which begins in step 100, wherein an arbitrary predetermined transmission channel is selected to begin the scanning operation. Whether this channel is occupied is detected in step 101, and if it is, the next transmission channel is selected in step 102 and the routine returns to step 101. Upon the detection of an unoccupied transmission channel, the routine moves to step 103, wherein modulator 16, demodulator 15, transmitter 11 and receiver 12 are set in response to control signals from control section 14, and in step 104 identifying code ID is transmitted at the high bit transmission rate, using wide band signal HDB occupying substantially all of the audio signal transmission band. In step 105, it is checked whether or not identifying code ID' has been retransmitted back from handset unit 20, and this check continues until identifying code ID' is detected. Once it has been detected, indicating that selected transmission channel $f_1$ has been established, identifying code ID is transmitted at the low bit transmission rate, using narrow band signal LDB. Identifying code ID is transmitted repeatedly as long as identifying code ID' continues to be received from handset 20 which is checked in step 107. When in step 107 it has been determined that identifying code ID' is no longer being received, it is decided that communication has ended and the routine ends in step 108.

FIG. 6 illustrates the corresponding operation of handset unit 20. When handset unit 20 is enabled, control section 24 begins a subroutine in step 200, wherein the conventional polling operation is conducted. The channels are sequentially searched to determine if the proper identifying code appears therein. The routine continues to return to step 200 until the proper identifying code ID is located, i.e. in selected transmission channel $f_1$, at which point the routine proceeds to step 201, wherein the selected transmission channel $f_1$ is established. Then in step 202, identifying code ID' is retransmitted for a predetermined interval at the high bit transmission rate to base unit 10 for confirmation that transmission channel $f_1$ has been established. In step 203, identifying code ID' is repetitively transmitted at the low bit transmission rate, while in step 204 it is repetitively checked whether or not identifying code ID from base unit 10 is still being received. Thus steps 203 and 204 within control section 24 correspond to step 106 and 107 within control section 14. However, if in step 204 it is determined that identifying code ID from base unit 10 is not found, and so the end of communication detected, the routine does not end, but rather returns to step 200 to once again begin the polling operation. Thus, handset unit 10 remains enabled to receive the next transmission.

Since identifying codes ID and ID' continue to be exchanged between base unit 10 and handset unit 20 over narrow band signal LDB, it is possible to detect when other radio frequency transmissions create interference, because such transmissions will not contain the appropriate identifying code. Countermeasures may then be taken to remove the problems caused by the interference. One appropriate countermeasure would be for control section 14 to begin the calling routine once again to scan for an available, interference-free transmission channel. It will be recalled that such unoccupied channels are detected by the low level of the electric field intensity. Whether this electric field intensity is being raised by another cordless telephone using the frequency of the particular transmission channel, or by any other source, the raised electric field intensity can be measured and a transmission channel in this frequency range can be avoided. Alternatively, the control sections 14, 24 could be adapted upon the detection of the interference to simply switch to another transmission channel, in a predetermined fashion, without going through the entire calling routine.

An additional advantageous feature of the signal transmission apparatus according to the present invention is that when one or the other of base unit 10 and handset unit 20 is disabled to stop communication, the transmission of the identifying code always stops. It may happen that due to an error in the system, the conventional call end signal is not transmitted or detected. However, it is straightforward to detect the absence of the identifying code for a predefined length of time, and this absence can be used itself as the communication end signal, so it is possible to positively detect the termination of communication and thereby to positively disconnect telephone network line L from telephone terminal section TC. In this way, base unit 10 will not appear to be in use when in fact it is not, so that erroneous busy signals will not be generated and incoming telephone calls may be received.

A still further advantageous feature is that the frequency band of signal LDB used for transmitting the identifying code may be used to transmit other information. For example, if a first telephone call has been received and base unit 10 and handset unit 20 are in communication, and then a second incoming call appears on telephone network line L, it is possible to send an indication thereof over this band to handset 20 to create a "call waiting" signal. A second additional use of this band would be to transmit the above-mentioned call end signal.

In the above described embodiment of the signal transmission apparatus according to the present invention as embodied in the cordless telephone of FIGS. 3 and 4, it has been assumed that identifying code ID stored in control section 14 and identifying ID' stored in control section 24 are the same. However, this is not necessary. If control section 14 stores an identifying code uniquely identifying base unit 10, and control section 24 stores an identifying code uniquely identifying handset 20, control sections 14 and 24 may be adapted to recognize the corresponding identifying codes from control sections 24, 14, respectively.

Additionally, in the above described embodiment, narrow band signal LDB was generated by MSK modulation. It will be understood that other types of modulation may be used. Examples of other appropriate types of modulation are frequency shift keying (FSK) and phase shift keying (PSK), of which minimum shift keying is a variation. Other modulation systems may be utilized, so long as they provide a wide band modulated signal for fast bit transmission before the transmission channel is established, and a narrow band modulated signal for bit transmission at a low rate afterwards.

In addition, the narrow band signal LDB in which the identifying code is transmitted after the transmission channel is established need not be located at the low frequency end of the audio signal transmission band, but may alternatively be provided at the high frequency end.

Finally, the communications system might be designed so that one transmitter could communicate with a specified plurality of receivers. For example, in a cordless telephone system, one base unit could have two or more handset units associated therewith. The signal transmission apparatus according to the present invention could readily be adapted to establish a transmission channel only between these components.

Having described specific embodiments of the invention with reference to the accompanying drawings, it will be understood that the invention is not limited to such specific embodiments, and that many modifications and variations may be effected therein by one skilled in the art without departing from the spirit or scope of the invention, which is to be defined by the appended claims.

What is claimed is:

1. In a communications system having a plurality of transmitters for transmitting information signals including audio signals over any one of a plurality of transmission channels, and further having a plurality of receivers for receiving said information signals transmitted over any of said transmission channels, each of said transmission channels having a respective total frequency range including an allocated range for transmitting said audio signals; signal transmission apparatus for establishing a selected transmission channel between a predetermined one of said transmitters and a predetermined one of said receivers, said apparatus comprising:

means at the predetermined transmitter for selecting one of said transmission channels;

means for transmitting at least a control signal indicative of the identity of said predetermined transmitter over the selected transmission channel, said means for transmitting initially transmitting said control signal by using substantially all of the allocated range of said selected transmission channel;

the predetermined receiver including means for establishing the selected transmission channel between it and said predetermined transmitter only in response to the receipt of said transmitted control signal identifying said predetermined transmitter; and means at said predetermined transmitter for confirming that said selected transmission channel has been established with said predetermined receiver and for generating a confirmation output thereon;

said predetermined transmitter being responsive to said confirmation output for transmitting said audio signals by using a first portion of said allocated range; and said means for transmitting being responsive to said confirmation output for transmitting said control signal by using a second portion of said allocated range separate from said first portion.

2. Apparatus according to claim 1; wherein said means for selecting includes means for sequentially scanning said plurality of transmission channels and for detecting a received electric field intensity within each said transmission channel, said means for selecting selecting a transmission channel having a received electric field intensity lower than a predetermined level.

3. Apparatus according to claim 1; wherein said control signal is an identifying code uniquely assigned to said predetermined transmitter.

4. Apparatus according to claim 3; wherein said means for establishing includes means for retransmitting a second control signal during a predetermined interval by using substantially all of said allocated range.

5. Apparatus according to claim 4; wherein said second control signal is an identifying code uniquely assigned to said predetermined receiver.

6. Apparatus according to claim 1; wherein said second portion of said allocated range for transmitting said control signal subsequent to confirmation is a narrow band frequency range within said allocated range.

7. Apparatus according to claim 6; wherein said second portion of said allocated range is a low frequency band of said allocated range.

8. Apparatus according to claim 1; wherein said communications system is a cordless telephone system, each said transmitter being a base unit of a respective cordless telephone and each said receiver being a handset unit of said respective cordless telephone.

9. Apparatus according to claim 8; wherein said control signal is a telephone number uniquely assigned to said predetermined transmitter and receiver.

10. Apparatus according to claim 1; wherein said means for transmitting includes modulating means supplied with said confirmation output for generating a modulated signal in response to said control signal having a first bandwidth equal to substantially all of said allocated range in the absence of said confirmation output, and having a second bandwidth equal to said second portion of said allocated range in the presence of said confirmation output.

11. Apparatus according to claim 10; wherein said second portion of said allocated range is a narrow band frequency range within said allocated range.

12. Apparatus according to claim 10; wherein said control signal is a binary signal, and wherein said modulating means includes means for minimum shift key modulating a reference signal in response to said control signal.

13. Apparatus according to claim 1; wherein said means for establishing includes means for polling said transmission channels to detect if a control signal is present therein and for determining whether a received control signal is indicative of the identity of said predetermined transmitter, and means for transmitting a second control signal indicative of the establishment of said selected transmission channel over said selected transmission channel in response to said determination.

14. Apparatus according to claim 13; wherein said means for determining includes means for comparing said received control signal with a reference control signal.

15. Apparatus according to claim 14; wherein said means for confirming includes means for detecting said second control signal transmitted over said selected transmission channel.

16. In a communications system having a plurality of transmitters for transmitting information signals including audio signals over any one of a plurality of transmission channels, and further having a plurality of receivers for receiving said information signals transmitted over any of said transmission channels, each of said transmission channels having a respective total frequency range including an allocated range for transmitting said audio signals; a method for establishing a selected transmission channel between a predetermined one of said transmitters and a predetermined one of said receivers, said method comprising the steps of;
  selecting one of said transmission channels;
  initially transmitting a control signal indicative of the identity of said predetermined transmitter over said selected transmission channel by using substantially all of the allocated range of said selected transmission channel;
  establishing said selected transmission channel;
  selecting a narrow band portion within said allocated range outside of a band portion occupied by said audio signals; and
  subsequentially transmitting said control signal with said audio signals, said control signal occupying said narrow band portion of said allocated range not occupied by said audio signals.

* * * * *